United States Patent
Khan et al.

(10) Patent No.: US 12,347,328 B2
(45) Date of Patent: Jul. 1, 2025

(54) SYSTEMS AND METHODS FOR SELF-CONTAINED MISSION MANAGEMENT

(71) Applicant: Honeywell International Inc., Charlotte, NC (US)

(72) Inventors: Kalimulla Khan, Bangalore (IN); Kirupakar Janakiraman, Madurai (IN); Raghu Shamasundar, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 347 days.

(21) Appl. No.: 18/158,151

(22) Filed: Jan. 23, 2023

(65) Prior Publication Data
US 2024/0177618 A1    May 30, 2024

(30) Foreign Application Priority Data
Nov. 24, 2022 (IN) .............................. 202211067687

(51) Int. Cl.
*G08G 5/34* (2025.01)
*B64D 45/00* (2006.01)

(52) U.S. Cl.
CPC ............... *G08G 5/34* (2025.01); *B64D 45/00* (2013.01); *B64D 2045/0075* (2013.01)

(58) Field of Classification Search
CPC .. B64D 45/00; B64D 2045/0075; G08G 5/21; G08G 5/26; G08G 5/34; G08G 5/53; G08G 5/55
See application file for complete search history.

(56) References Cited

U.S. PATENT DOCUMENTS

2020/0035116 A1\* 1/2020 Sivaratri .................. G09B 9/08

\* cited by examiner

*Primary Examiner* — Dale Moyer
(74) *Attorney, Agent, or Firm* — ALSTON & BIRD LLP (57) ABSTRACT

A system includes avionics line-replaceable units (LRUs); a mission manager including application programming interfaces (API); a processing device; and a memory storing one or more machine readable instructions causing the system to: communicatively couple the mission manager to external avionics services via a data gateway to receive updated mission conditions at the mission manager; register one of the avionics LRUs with one of the mission manager APIs; receive, at the mission manager, updated mission conditions from the external avionics services via the data gateway; provide one or more of the one or more updated mission conditions to the registered avionics LRU based on one or more of an updated mission plan and an unexpected update to the mission condition; and control one or more aircraft systems based on one or more of the updated mission plan and the unexpected update to the mission condition.

20 Claims, 9 Drawing Sheets

SYSTEMS AND METHODS FOR SELF-CONTAINED MISSION MANAGEMENT

CROSS-REFERENCE TO RELATED APPLICATION(S)

This application claims the benefit of priority to Indian Application No. 202211067687, filed on Nov. 24, 2022, the entirety of which is incorporated by reference herein.

TECHNICAL FIELD

Various embodiments of the present disclosure relate generally to the field of managing aircraft missions, and more particularly, to systems and methods for self-contained mission management.

BACKGROUND

Dynamic factors like weather, air traffic, Temporary Flight Restrictions (TFR) and other Notices to Airmen (NOTAM), Pilot Reports (PIREP), and other events or notices during a flight may require a crew of an aircraft to constantly work with one or more external agents (e.g., ground controllers) to assess various changes to a flight plan and to draw insights based on the events and notices. Changes to one parameter can have an impact on others, which follow on impacts must be evaluated before making any changes to a flight plan. As an example, if a crew wants to reroute a flight path to avoid an area restricted by a TFR, any newly-proposed route must be evaluated to see whether it is clear of traffic and weather phenomenon. As another example, incoming PIREPs must be independently verified and any detected anomalies reported.

Each of these computations, calculations, or decision-supporting criteria requires data from various sources that the crew must retrieve before performing its evaluation of an alternate plan, which evaluation can be intensive. Improved connectivity in avionics has enabled a new way to leverage data from various sources, both internal and external, to support decision making. For example, information can be passed on to a crew via in-flight connectivity to various information sources. However, there is no singular, intelligent system that can aid a pilot by providing relevant information at the right time for real-time decision making without involving the crew or ground controllers.

The solution proposed herein is an intelligent system hosted in an aircraft-based gateway that monitors an aircraft state and mission to provide continuous availability of whatever information may be required for decision making without requiring a crew's intervention. Any changes to the mission may also be monitored during a flight and information required for a changed mission may made available in real-time. Besides getting information from external systems, this system may also query one or more internal avionics line-replaceable unit (LRU) system to support decision making. For example, in a case in which a new route is drafted by a crew, the proposed system may retrieve real-time weather information from an onboard weather radar and combine that real-time weather information with weather forecasted by an external service to provide integrated situational weather information to the crew. The re-route trajectory may also be evaluated using an enhanced ground proximity warning system (EGPWS) service to look for any terrain alerts or warnings that may be encountered and to alert the crew with necessary notifications prior to activation.

The present disclosure is directed to overcoming one or more of these above-referenced challenges or shortfalls.

SUMMARY OF THE DISCLOSURE

According to certain aspects of the disclosure, methods and systems are disclosed for self-contained mission management.

For instance, in one embodiment, a system includes a plurality of avionics line-replaceable units (LRUs); a mission manager comprising one or more application programming interfaces (API); a processing device, capable of executing one or more machine readable instructions; and a memory storing one or more machine readable instructions, that when executed by the processing device cause the system to: communicatively couple the mission manager to one or more external avionics services via a data gateway to receive one or more updated mission conditions at the mission manager; register at least one of the plurality of avionics LRUs with one or more of the mission manager APIs; receive, at the mission manager, one or more updated mission conditions from the external avionics services via the data gateway; provide one or more of the one or more updated mission conditions to the registered avionics LRU based on one or more of an updated mission plan and an unexpected update to the mission condition; and control one or more aircraft systems based on one or more of the updated mission plan and the unexpected update to the mission condition.

In another embodiment, a method includes communicatively coupling a mission manager including one or more mission manager APIs communicatively coupled to a plurality of avionics LRUs to one or more external avionics services via a data gateway to receive one or more updated mission conditions at the mission manager; registering at least one of the plurality of avionics LRUs with one or more of the mission manager APIs; receiving, at the mission manager, one or more updated mission conditions from the external avionics services via the data gateway; and providing one or more of the one or more updated mission conditions to the registered avionics LRU based on one or more of an updated mission plan and an unexpected update to the mission condition.

In yet another embodiment, a system includes a plurality of avionics line-replaceable units (LRUs); a mission manager comprising one or more application programming interfaces (API) communicatively coupled to one or more applications; a processing device, capable of executing one or more machine readable instructions; and a memory storing one or more machine readable instructions, that when executed by the processing device cause the system to: receive, at the mission manager, a request to register one or more applications via one or more of the application programming interfaces, wherein acceptance of the request to register enables the mission manager to provide mission condition updates the applications; provide mission condition updates to the application based on the registration of the one or more applications to the mission manager via the application programming interfaces; and receive one or more changes to a mission condition from one or more aircraft systems and provide a mission condition update to the application based on receipt of the changes to the mission condition, wherein the provision of the mission condition update to the application is based on a magnitude of the received one or more changes to the mission condition.

Additional objects and advantages of the disclosed embodiments will be set forth in part in the description that follows, and in part will be apparent from the description, or may be learned by practice of the disclosed embodiments.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Various embodiments of the present disclosure relate generally to the field of managing aircraft missions, and more particularly, to systems and methods for self-contained mission management. While this disclosure describes the methods and systems with reference to aircraft, it should be appreciated that the present methods and systems may be applicable to various other vehicles (e.g. urban air mobility (UAM) hybrid vertical takeoff and landing (VTOL) vehicles, etc.)

Because aircraft missions can require modification so rapidly based on various factors (e.g., weather, equipment requirements, passenger emergency, etc.) and because modifications to missions require careful input and review from aircraft crew, an automated, self-contained mission manager is required. The automated, self-contained mission manager may receive inputs from various internal and external systems to modify a current planned mission to a modified state in response to an emergent requirement. The following description provides details associated with systems and methods for such automated mission management.

Figure 1:
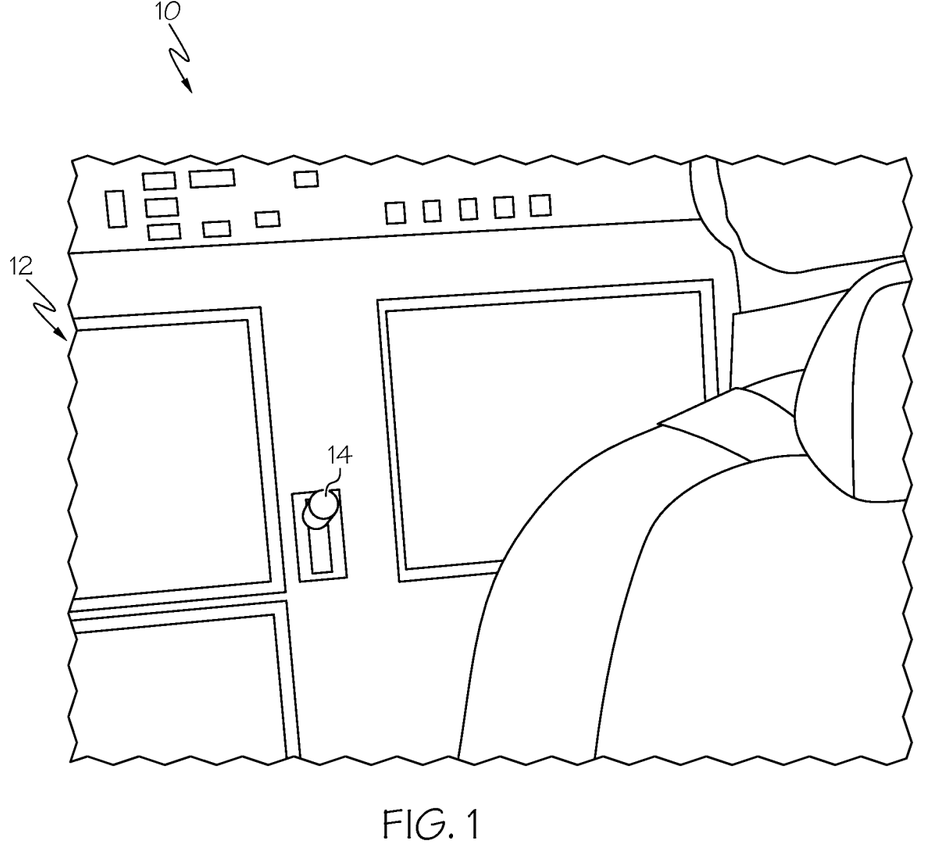
FIG. 1 depicts an exemplary cockpit of an aircraft including a plurality of displays, which may be used to display outputs of one or more avionics systems and an exemplary electronic flight bag, according to one or more embodiments.

FIG. 1 depicts an exemplary cockpit 10 of an aircraft including a plurality of displays 12 and control systems 14 for displaying visual outputs from one or more avionics systems, aircraft sensors, communication systems, and other aircraft-related systems and for controlling one or more systems aboard an aircraft. The aircraft control systems and other aircraft related systems may be automatically controlled, remotely controlled, and/or manually controlled (e.g., by one or more pilots and/or crew of the aircraft). The displays 12 may provide visual information to the crew in order to make decisions regarding the operation of the aircraft and for other reasons related to aircraft and related systems control. The control system 104 may be operable by the crew in order to control the aircraft systems. In some embodiments, the aircraft may include a flight management system (FMS), an electronic flight bag (EFB), one or more sensing systems (e.g., radar, LiDAR, weather sensors, etc.) and other systems which may be displayed in the cockpit 10 on the displays 12. The displays 12 may be input/output devices (e.g., touchscreen devices) capable of receiving a user input (e.g., from the pilot(s)) in addition to providing visual information. The cockpit may further include one or more audio and/or haptic systems (not shown) for providing audio information to the crew (e.g., one or more alarms).

Figure 2:
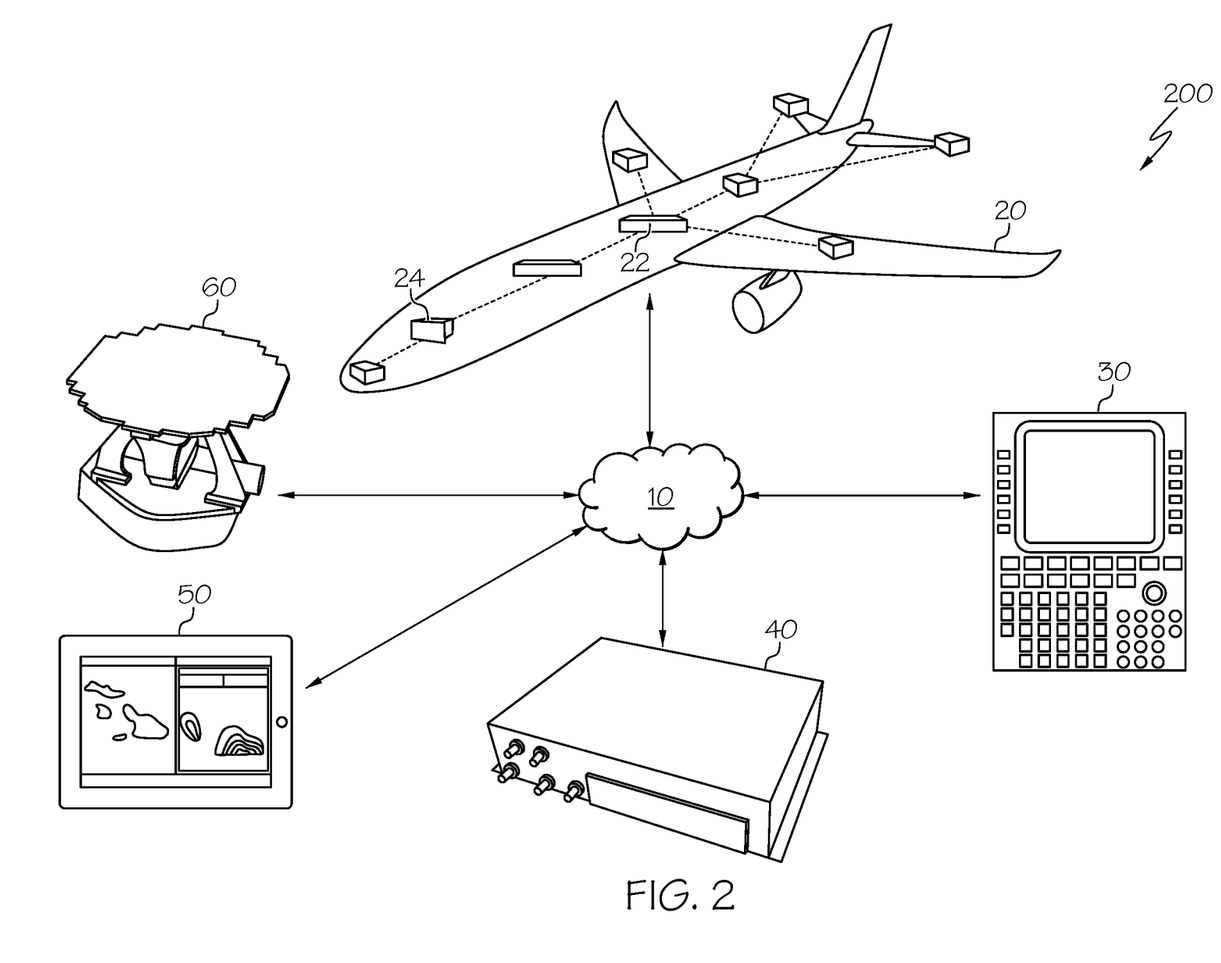
FIG. 2 depicts an exemplary aircraft-based network system architecture for the aircraft of FIG. 1.

Referring to FIG. 2, a network environment embodied as system 200 for self-contained mission management is shown. The network environment includes an aircraft 20, which may include an aircraft-based data gateway ("ADG") 22 that may couple to a plurality of avionics line-replaceable units (LRU) 24, one or more flight management systems (FMS) 30, one or more network routers 40, one or more weather systems 50, which weather systems may include one or more external facing weather sensors (not depicted), one or more radars 60, and other systems. The various systems may connect to a data network 10 (e.g., a cloud network) via one or more communications systems aboard the aircraft 20 (e.g., a SATCOM system, an HF communications system, a VHF communications system, a FOMAX/AoIP system, etc.)

The ADG 22 may enable real-time wireless distribution of databases, loadable software, flight data, and passenger traffic enhancing aircraft and flight efficiencies, and may enhance connections to EFB applications for pilots from ground servers, for example, while the aircraft 20 is grounded or via SATCOM or other communications device while in flight. The EFB may include one or more charts, graphs, data related to the operation of the aircraft and/or regulatory requirements associated with operating the aircraft. The ADG 22 may be, for example, a single unit or multiple units that act as a gateway for all data that flows into and out of the aircraft. The ADG 22 may connect the EFB to aircraft systems and parameters to further enable applications as described herein.

The one or more LRUs 24 may be one or more modular components that may be designed to be replaced quickly at an operating location (e.g., a first line). Each avionics LRU 24 may be a sealed unit such as, for example, a radio, a radar, a sensor, a traffic control unit, a weather unit, or other auxiliary equipment that can be stocked and replaced quickly to restore a mobile systems to service. The avionics LRUs 24 may include communications, navigation, display and management systems, and any other of the various systems that are fitted to an aircraft to perform individual functions. The avionics LRUs may assist with and provide crews access to systems enabling, for example, published routes and procedures for improved navigation and routing, negotiated trajectories thus adding data communications to create preferred routes dynamically, delegated separation for enhanced situational awareness in the air and on the ground, low visibility/ceiling approach/departure for enabling operations with weather constraints with less ground infrastructure, surface operations to increase safety in approach and departure, and air traffic management (ATM) efficiencies to improve the ATM process.

Figure 6:
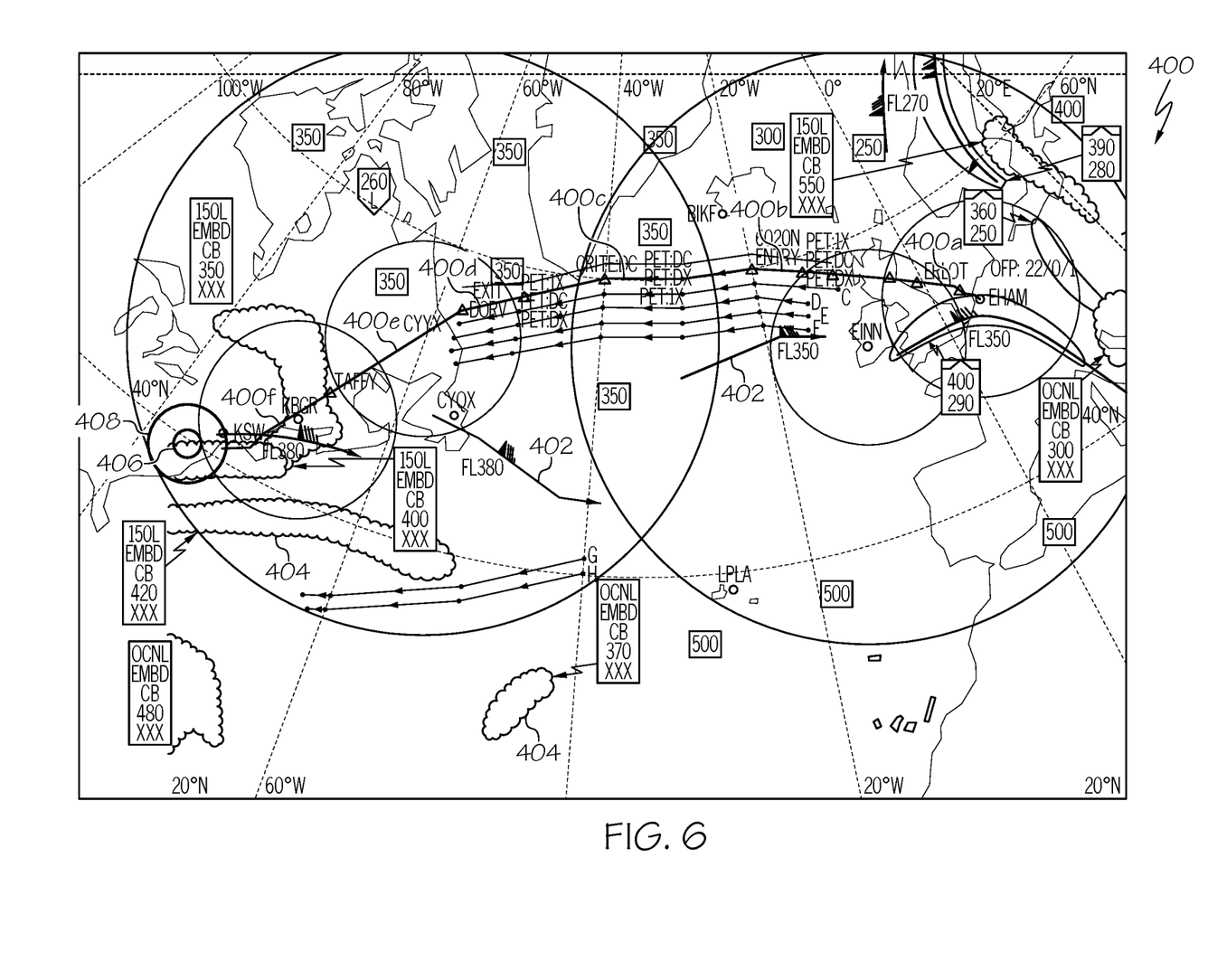
FIG. 6 depicts an exemplary flight path for a flight completed by an aircraft such as the aircraft of FIG. 1.

The FMS 30 may be a specialized computer system that may automate various in-flight tasks. One function of the FMS 30 may be, for example, to manage the flight plan for any given flight. The FMS 30 may receive input from various sensors and systems (not shown), such as, for example, a GNSS system, an INS system, a radio navigation system, etc. to determine the aircraft's position. Using the sensors and systems, the FMS may guide the aircraft along a given flight plan (e.g., to New York from Amsterdam, as shown in FIG. 6). The FMS 30 may be controlled, for example, through a Control Display Unit (CDU) which CDU may incorporate various input/output devices (e.g., a small screen and keyboard and/or touchscreen). The FMS 30 may send a flight plan for display to an Electronic Flight Instrument System (EFIS), Navigation Display (ND), or Multifunction Display (MFD), which systems and displays could be displayed on an input/output device (e.g., in the cockpit 10). In some embodiments, the FMS 30 may include, as one example, a flight management computing device, a control display unit, and a cross talk bus.

Still referring to FIG. 2, the FMS 30 may be communicatively coupled to a flight data system (FDS), which FDS may include, for example, one or more gateways that are configured to receive data from one or more aircraft systems (e.g., the radar system 60, an engine system, an auxiliary power unit, wheel systems, brake systems, navigation, collision avoidance, flight recorders, automatic traffic control systems, etc.) and sensors (e.g., flow sensors, pressure sensors, temperature sensors, altimeters, airspeed indicators, position sensors, oxygen sensors, force sensors, vibration sensors, compasses, magnetometers, gyroscopes, altitude heading sensors, tachometers, etc.) to record data generated by the aircraft during flight. The FDS can include one or more modules configured to enact one or more of its processes. For example, the FDS may include a network server platform, a network server device manager, an action handler module, a domain analytic applications module, a data store, a cloud connector module, a rules engine module, a bus management module, a node agent module, a data ingress/egress module(s), an edge analytics software development kit (SDK), a data bus, and one or more software API modules (e.g., a python API, a Linux API, etc.) The FDS may acquire, record, download, and analyze data in order to make one or more recommendations to the operators of the aircraft in real time.

The network router(s) 40 may be distributed throughout an aircraft in a distributed architecture which can provide optimum coverage through a cabin and flight deck and provide redundancy to the various devices and systems throughout the cabin and flight deck. The network router(s) 40 may be compatible with a range of satellite communications systems including satellite networks. The network route(s) 40 may be configurable to work as a router, wireless access port, data loader, and/or electronic flight bag connection.

The weather system 50 and the radar system 60 may work together, along with similar weather systems and radar systems of other aircraft, to form a connected crowdsourced weather network between the various aircraft connected to the network 10. The weather system 50 and the radar system 60 may share weather information on the network 10 and receive shared information from the network 10, which information may be aggregated weather data from multiple aircraft such as the aircraft 20. The weather system 50 and radar system 60 may be capable of predicting lightning, hail, wind shear, turbulence, using volumetric 3-D scanning and pulse compression technologies. The radar system 60 may, for example, scan an entire volume of air in front of the airplane from the ground to a given altitude (e.g., 60,000 feet) and up to a given distance (e.g., 320 nautical miles) ahead of and/or surrounding the aircraft. The weather system 50 and/or radar system 60 may use 3-D volumetric scanning to analyze storm clouds the radar system 60 detects and look for negative weather conditions. The weather system 50 and/or radar system 60 may utilize a position input (e.g., via GNSS, inertial navigation, etc.) to leverage a terrain data base to differentiate ground clutter from weather returns.

Figure 3:
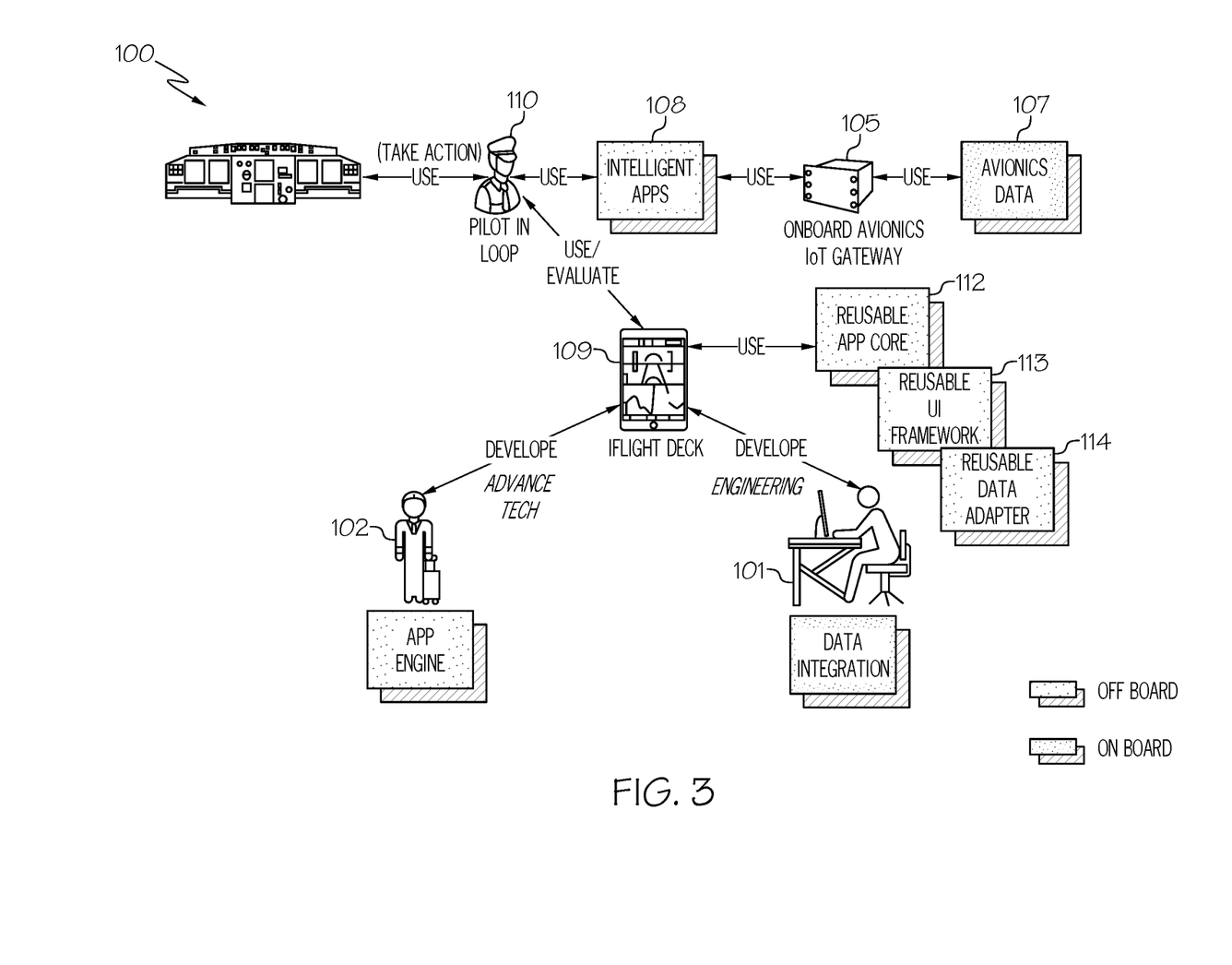
FIG. 3 depicts an exemplary diagram of a data flow for an exemplary aircraft-based network system such as the aircraft-based network system of FIG. 2.

FIG. 3 further depicts exemplary avionics and related connected systems which may be connected in a data flow 100, according to one or more embodiments. In step 101, an operator and/or engineer may use "data integration" engines to develop rules and/or one or more applications ("Engineering") using an integrated flight deck (IFD) 109, which can be a cloud based dashboard. In step 102, a safety officer and/or flight data analysis may use an app engine to develop SDKs ("Advance Tech") that configure one or more self-contained mission managers in the IFD 109. In steps 112, 113, and 114, a reusable app core 112, reusable user interface framework 113, and reusable data adapter 114, respectively, may pack metadata and send that metadata to edge hardware via IFD 109 (e.g., using an orchestrator of a networked computing system, as discussed more particularly herein). In step 105, an onboard gateway (e.g., the data gateway 304 of FIG. 5) may deliver avionics data 107 to an edge analytics software development kit (SDK) associated with intelligent apps 108. The avionics data 107 may be consumed data through the SDK of intelligent apps 108, at step 105. The onboard intelligent applications 108 may be configured to consume the avionics data 107 via the onboard avionics IoT gateway (step 105) to deliver one or more inferences, suggestions, or recommended actions to pilot 110 and/or crew of the aircraft using the IFD 109 (e.g., one or more actions that the pilot can take or the aircraft can perform to result in changing a flight operation, such as flight operation savings. Flight operation savings can be directed towards safety, maintenance, weather related operations, fuel conservation, resource management, etc.). An actionable update (e.g., a sync) may then be made to system 111. In some embodiments, the actionable inferences, recommendations, and suggestions along with additional information may be provided to an electronic flight bag application and/or one or more external or internal applications by the aircraft data gateway.

Figure 4A:
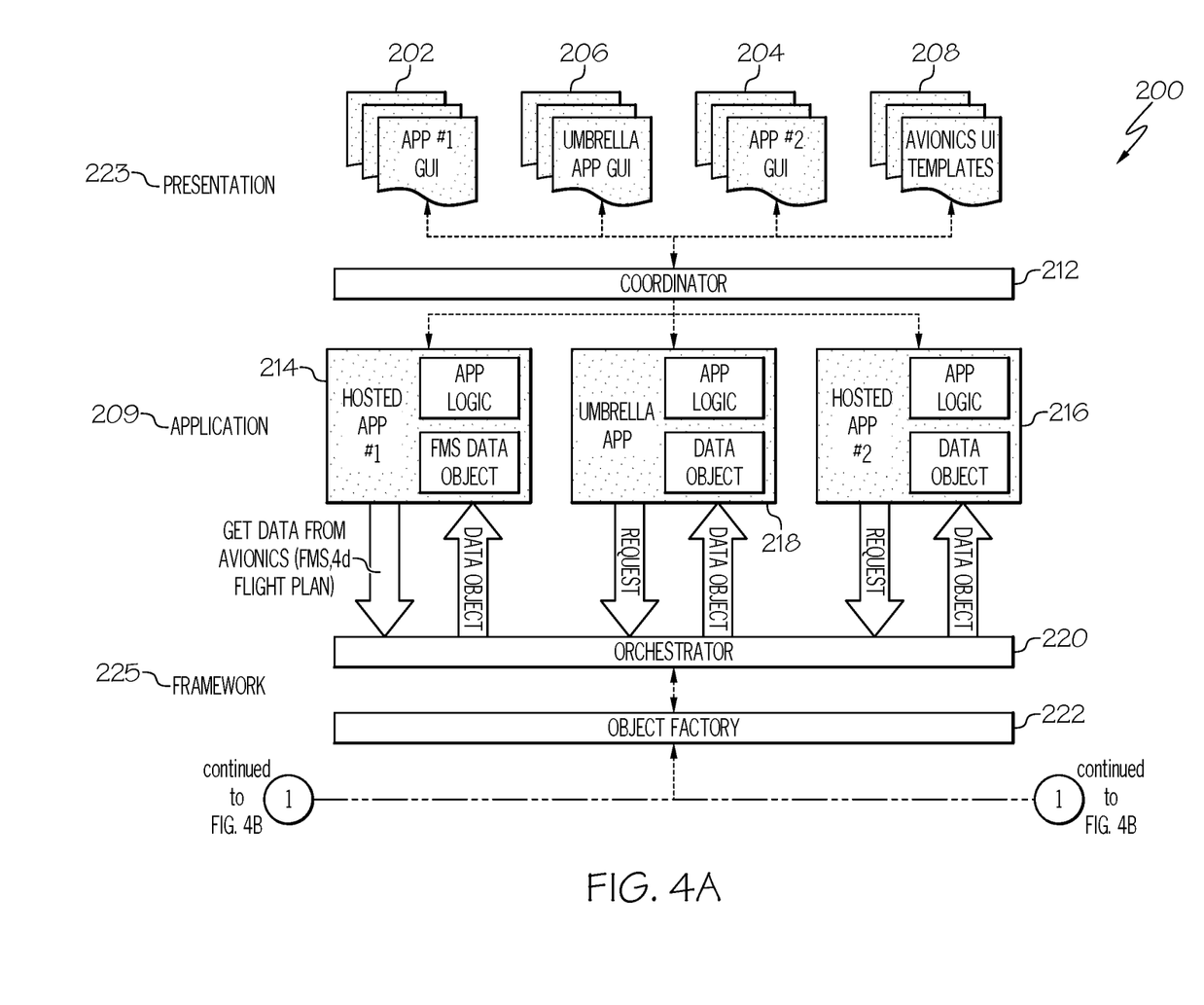
FIG. 4A depicts a portion of a schematic block diagram of a framework of a platform of the networked computing system environment of FIG. 2.
Figure 4B:
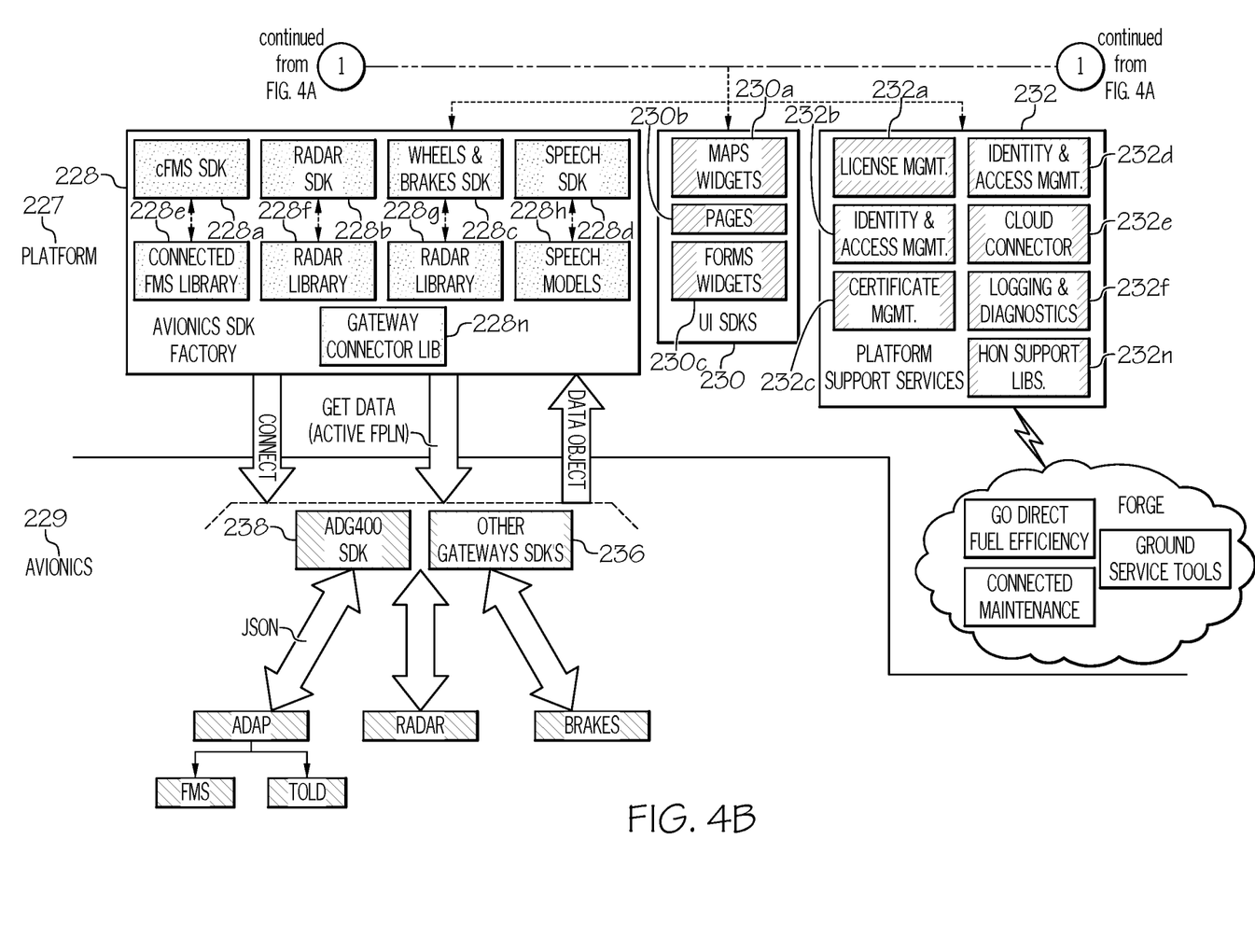
FIG. 4B depicts a portion of a schematic block diagram of a framework of a platform of the networked computing system environment of FIG. 2.

FIG. 4A and FIG. 4B depict an exemplary high-level architecture of herein disclosed system 200. Specifically, system 200 describes an example IFD platform configured to provide end-to-end real-time data acquisition (e.g., to provide real-time flight insights and maintenance alerting) with seamless access to data from multiple and at times different or varying data sources (e.g., data from avionics data sources) and flexibility to configure events or report fault events. System 200 includes advanced fault detection logic that can be incorporated to identify anomalies without the constraint of computational power and data access. In turn, real-time detection helps end users (e.g., flight crew) to perform self-contained mission management and/or to take corrective actions to prevent operational disruptions.

As shown in FIG. 4A and FIG. 4B, the overall architecture of system 200 is illustrated including the SDK components and corresponding framework. System 200 uses real-time accurate models and visual analytics to deliver intelligent actionable recommendations inflight and in real-time to the end user (e.g., a pilot, flight crew, etc.). System 200 is extensible and portable for deployment in any cloud or data center environment for providing an enterprise-wide, top to bottom view, displaying the status of processes, assets, people, and safety. System 200 includes a collection of framework components, SDKs, UI libraries, and rules that specify how applications are developed from the platform and how additional SDKs and UI libraries can be added to the platform. Further, system 200 supports end-to-end capability to execute digital twins against process data and to translate the output into actionable insights as detailed further herein.

Computer systems of system 200 may include any type or quantity of one or more processors and one or more data storage devices including memory for storing and executing applications or software modules. In one embodiment, the processors and data storage devices are embodied in server-class hardware, such as enterprise-level servers. For example, the processors and data storage devices may include any type or combination of application servers, communication servers, web servers, super-computing servers, database servers, file servers, mail servers, proxy servers, and/virtual servers. Further, the one or more processors are configured to access the memory and execute processor-readable instructions, which when executed by the processors configures the processors to perform a plurality of functions of the system 200.

The computer systems of system 200 are configured to receive and transmit data between other components to produce a desired technical result. In one embodiment, system 200 is organized into a plurality of layers of a networked computing environment comprising a coordinator 212 and an orchestrator 220. As detailed further below, components of coordinator 212 are in communication with components of orchestrator 220 via a network. The network may be any suitable network or combination of networks and may support any appropriate protocol suitable for communication of data to and from components of coordinator 212 and orchestrator 220 via the cloud and between various other components in the networked computing system 200. The network may include a public network (e.g., the Internet), a private network (e.g., a network within an organization), or a combination of public and/or private networks. The network may be configured to provide communication between various components described herein and depicted in the figures.

The network may include one or more networks that connect devices and/or components in the network layout to allow communication between the devices and/or components. For example, the network may be implemented as the Internet, a wireless network, a wired network (e.g., Ethernet), a local area network (LAN), a Wide Area Network (WANs), Bluetooth, Near Field Communication (NFC), or any other type of network that provides communications between one or more components of the network layout. In some embodiments, the network may be implemented using cellular networks, satellite, licensed radio, or a combination of cellular, satellite, licensed radio, and/or unlicensed radio networks.

System 200 may support multiple layers, such as, for example, a presentation layer 223, an application layer 209, a framework layer 225, a platform layer 227, and an avionics layer 229, as shown. In Aerospace Internet of Things (AIoT) systems, AIoT providers may direct their focus toward connecting onboard avionics devices, extracting data from those devices, and sending the data to the cloud for analytics with the help of one or more onboard IoT gateways (e.g., gateway connector library of the avionics SDK factory 228a-n, other gateway SDKs 236 of the avionics layer 229, etc.). In one embodiment, the presentation layer 223 of system 200 includes a plurality of graphical user interfaces (GUI) of applications 202, 204 (e.g., an umbrella application GUI), 206, as well as avionics GUI templates 208. The presentation layer 223 and application layer 209 can include the application associated with system 200 and features hosted therein, including the GUI for a user to interact with the application as well as the business logic of the application. Additional UI features can be added at any time as detailed in the reference architecture The application layer 209 can include one or more hosted applications 214, 216, 218 with corresponding logic and concrete data objects. In some aspects, applications 214, 216, 218 may perform business logic on data streams. Communication between components of the presentation layer 223 (e.g., application GUIs 202, 204, 206) and components of application layer 209 (e.g., applications 214, 216, 218) may be performed using coordinator 212 via the network, which may include use data and security communications.

A connected avionics system, such as that described herein, may have the data stream injected into gateways from multiple onboard avionics subsystems, such as flight management system (e.g., FMS 30), enhanced ground proximity warning systems (EGPWS), weather radar 60, brakes systems (not depicted), etc. for data transfer to cloud-based analytics. In this respect, orchestrator 220 may be configured to push and pull information from applications 214, 216, 218, for example, upon receipt of instructions from users of application GUIs 202, 204, 206, 208. In some aspects, hosted application 214 can push data objects from orchestrator 220 and/or pull data from data sources in communication with orchestrator 220 (e.g., avionics data such as FMS, 4D flight plan, etc.). Orchestrator 220 in turn can be in communication with an object factory 222 of the framework layer 225, which creates the interface for data objects.

The framework layer 225 can be communicatively coupled between the SDKs of platform layer 227 and the applications of the application layer 209 and function as a standard interface that all SDKs can expose. In some aspects, the framework layer 225 creates concrete instances of the SDKs, managing the number of objects created. The object factory 222 can be communicatively coupled to components of the platform layer 227. For example, object factory 222 can be configured to handle objects from the avionics SDK factory 228a-n, user interface (UI) SDKs 230a-n, and platform support services 232a-n. Avionics SDK factory 228a-n can include SDKs related to cFMS, RADAR, wheels and brakes, speech, connected FMS, RADAR, gateway connectors, and the like. UI SDKS 230a-n can include maps widgets, pages widgets, forms widgets, and/or the like. Platform support services 232a-n can include components related to license management, identity and access management, certificate management, launch darkly, cloud connectors, logging and application dynamics, support libraries and the like. In some aspects, platform support services 232a-n can be communicably connected to gateway devices, such as connected gateway devices.

Platform layer 227 can contain all of shared SDKs of the system 200, whereby the shared SDKs contain all the connectivity to external devices and any other content that can be shared across applications. Components of avionics SDK factory 228a-n can include hosted SDKs for avionics and/or flight management such as Flight Management Systems, Enhanced Ground Proximity Warning System (EGPWS), Traffic Collision Avoidance System TCAS, Weather or RADAR Systems, electronic flight bag (EFB) devices, wheels, connected FMS library, speech models, gateway connector libraries, etc. It is understood that these hosted SDKs can be software entities which can be included to generically manage interfaces and connections, provide access to engines, and host other shareable features. Avionics SDK factory 228a-n can be communicatively coupled to the avionics layer 229, including components thereof. For example, avionics SDK factory 228a-n can be configured to connect with the avionics layer 229 and receive components therefrom. In some aspects, content to be shared that does not exist within a predetermined SDK can be encapsulated within a SDK wrapper. Such SDKs can come prepacked within platform layer 227 and provide core capabilities that can be required by an application (e.g., data logging, connection to both avionics and the cloud, data management, security management, etc.).

Components of the avionics layer 229 can include SDKs of aircraft servers (e.g., ADG400 SDK 234) as well as other gateway SDKs 236. SDKs of aircraft servers can in turn be communicatively coupled (e.g., SDKs of aircraft servers can filter and convert complex avionics data into various streaming formats such as JavaScript Object Notation (JSON), Extensible Markup Language (XML), etc.) and transmit the converted avionics data to various client applications with avionics data processing service (ADPS) gateway 238. ADPS gateway 238 can serve as a point of entry between system 200 as well as a point of entry for a group of micro-services, such as the connected FMS micro-services 240, takeoff-and-landing data systems (TOLD) 242, and/or the like. ADPS gateway 238 may be, for example, configured to be updated each time a new micro-service is added or removed in the connected FMS micro-services 240. ADPS gateway 238 may be implemented as hardware, software, and/or a combination of hardware and software.

A key attribute of the IFD of system 200 is the ability to add additional content as plugins to the existing application, providing extensibility, flexibility, and isolation of application features and customs processing logic. Therefore, in addition to object factory 222, a plugin manager 224 can be communicatively coupled to orchestrator 220, whereby plugin manager 224 can be in communication with registration store 226. In particular, system 200 includes components of the platform layer 227 and orchestrator 220, including object factory 222, plugin SDK 332a-n and new SDKs 334a-n to plug-in, as shown in FIG. 3. In so doing, platform layer 227 (e.g., orchestrator 220) in concert with coordinator 212 enables system 200 to provide an umbrella application that can be found in an app store and once installed enables the purchase and use of additional hosted apps as they become available. For example, newer applications can be readily added at the application layer 209 and/or presentation layer 223.

One or more rules engines of the system may be highly customizable frameworks for complex event processing. The term "engine" as used in this disclosure is understood as a self-contained piece of business functionality with interfaces contained within a hosted SDK (e.g., a microservice). Some non-limiting examples of engines contemplated for use with system 200 and related methods of this disclosure can include a Flight Management Engine (FME), Takeoff and Landing Engine (TOLDE), a Navigation Database Engine, as well as higher order content as a flight plan comparator utility. This enables efficient data filtering where patterns of incoming data are dynamic in nature. It not only helps in reducing the quantity of data but also ensures the quality of data being pushed to the cloud.

The herein discussed rules engine(s) may be used as a framework for building event-based workflows. The rules engine may include one or more of three main components: a message component, e.g., any incoming event; a rules node; and/or a rules chain. The message may refer to incoming data from devices, device life-cycle event, REST API event, RPC request, etc. The rules node may be a function that would be executed on an incoming message. There are many different node types that can filter, transform, and/or execute some action on incoming message. The rules chain may be nodes relate to each other with relations, so the outbound message from rule node is sent to next connected rule nodes.

Below are some common use cases for configuring rule chains: data validation and modification for incoming telemetry or attributes before saving to the database; copy telemetry or attributes from devices to related assets so you can aggregate telemetry, e.g., data from multiple avionics sub-systems can be aggregated in related asset; create/update/clear alarms based on defined conditions; trigger actions based on edge life-cycle events, e.g., create alerts if device is online/offline; load additional data required for processing, e.g., load temperature threshold value for a device that is defined in device's customer or tenant attribute; trigger REST API calls to external systems; raise alarms/alerts when complex event occurs and use attributes of other entities inside email template; and/or consider user preferences during event processing. In some aspects, messages transmitted from system 200, such as triggers and/or alerts, can be configured for transmitting information to flight crew and ground controllers for maintenance preparations reducing the aircraft-on-ground (AOG) times. System 200 can also be configured to detect near misses can also be configured in the IFD to build a trend model for early detection of anomalies before faults or malfunctions occur increasing safety.

Figure 5:
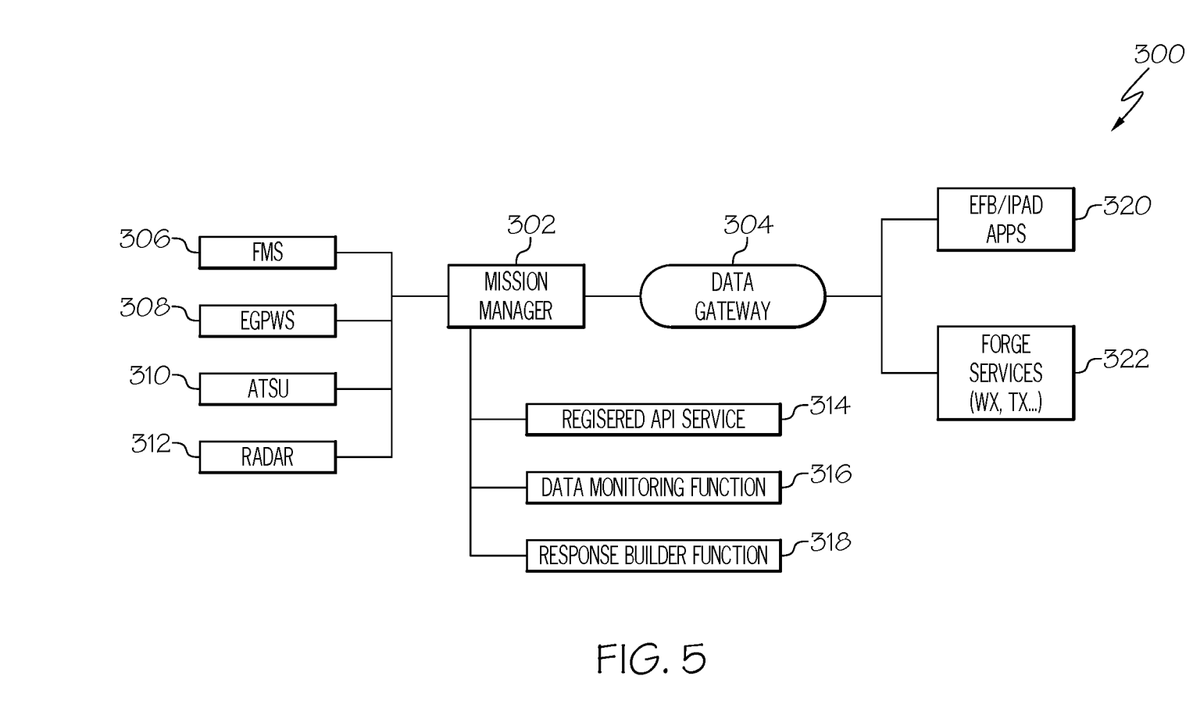
FIG. 5 depicts an exemplary system diagram for the aircraft of FIG. 1.

FIG. 5 depicts an exemplary system diagram for self-contained mission management system 300 on board an airborne asset. The system 300 includes, among other things, a mission manager 302 and a data gateway 304. The data gateway 304 may be an aircraft data gateway ("ADG"). The mission manager 302 may be communicatively coupled to one or more avionics LRUs such as a flight management system 306, an enhanced ground proximity warning system (EGPWS) 308, an air traffic services unit (ATSU) 310, a radar system 312, and could include one or more additional LRUs. The mission manager 302 may further be communicatively coupled to one or more registered API services 314, one or more data monitoring modules 316, and one or more response builder modules 318. The data gateway 304 may communicatively couple the aircraft or other airborne asset to one or more external applications, modules, or devices, such as, for example, an EFB application 320 and one or more external services 322.

The FMS 306 may be a specialized computer system that may automate various in-flight tasks. One function of the FMS 306 may be to manage the flight plan for any given flight. The FMS 306 may receive input from various sensors and systems (not shown), such as, for example, a GNSS system, an INS system, a radio navigation system, etc. to determine the aircraft's position. Using the sensors and systems, the FMS 306 may guide the aircraft along a given flight plan (e.g., from New York to Amsterdam, as shown in FIG. 5). The FMS 306 may be controlled, for example, through a Control Display Unit (CDU) which CDU may incorporate various input/output devices (e.g., a small screen and keyboard and/or touchscreen). The FMS 306 may send a flight plan for display to an Electronic Flight Instrument System (EFIS), Navigation Display (ND), or Multifunction Display (MFD), which systems and displays could be displayed on an input/output device (e.g., smart pad, touchscreen, etc.) of a computing device, for example.

The EGPWS 308 may provide one or more capabilities for reducing a risk of controlled flight into terrain by providing flight crews with timely, accurate information about terrain and obstacles in an area. The EGPWS 308 may use, for example, various aircraft inputs (e.g., GNSS, INS, radio navigation, etc.) and an internal or external database to predict and warn flight crews of potential conflicts with obstacles or terrain. A terrain/obstacle/runway database may be periodically updated and uploaded to the aircraft, for example, the database may be updated every 56 days. The EGPWS 308 may be configured to issue one or more alarms in response to an alarm activation.

The ATSU 310 may be an avionics computer that may perform one or more of the functions generally found in communication management units installed on some aircraft. The ATSU 310 may perform one or more aspects of aircraft and operational data reporting, including engine, fuel, avionics and maintenance reporting. Software associated with the ATSU may be configured with functionality in a user-modifiable aircraft operational control (AOC) database that can be tailored directly by a client (e.g., a user of the system) using an Aircraft Communications Addressing and Reporting System (ACARS) Reconfiguration Tool or by other tools. The AOC databases may be loadable on-wing and may not require aircraft certification. In some embodiments, an ATSU may comprise three or more components, for example: ATSU hardware, ATSU interface software, ATSU AOC software and AOC database.

Still referring to FIG. 5, the mission manager 302 has access to the data generated and services provided by the avionics LRUs 24 via a registered API services module 314 and may be connected to external eco-system via the data gateway 304. The mission manager may act as the end point for all external APIs and/or application services (e.g., weather forecasting, traffic control, wind measurement and prediction, receipt and processing of NOTAMs, etc.) and may allow the avionics LRUs 24 to register to various APIs based on the need of the avionics LRUs 24. The avionics LRUs 24 may also subscribe their services (e.g., connected weather, connected FMS, etc.) via the mission manager for cross connection by other LRUs and external services. Additionally, the mission manager 302 can be configured to monitor various mission parameters of the avionics LRUs 24 (e.g., via the data monitoring function 316) and provide appropriate data services. Based on the type of change of mission or change of external data impacting the mission, the mission manager 302 can build an appropriate response (e.g., via the response builder function 318) and send it to avionics LRUs 24 and/or to external services (e.g., via the network router(s) 40).

FIG. 6 shows an exemplary flight path 400 for a flight in which a mission manager needs to update one or more mission parameters during flight based on on-board or externally generated data. While FIG. 6 is generally described with respect to an update to a flight plan, it is to be understood that multiple other mission parameters could be updated based on similar methods and using similar systems, such as, for example, an altitude profile, a speed profile, a thrust profile, a cost estimate, various performance data, various mission constraints, and other mission parameters. FIG. 6 shows a flight from Amsterdam to New York across the Atlantic ocean, which flight is affected by wind 402, weather systems 404, and includes multiple legs 400*a*, 400*b*, etc. Each leg of the flight path 400 generally includes a course, a speed, and an altitude at which the aircraft will operate as it proceeds along the flight path 400. The chart can further include, and the flight path 400 may be affected by, one or more anomalies such as, for example, a NOTAM 406 and a PIREP 408, which may be graphically depicted on a chart as one or more range rings surrounding an area about which information or special restrictions or conditions have been put in place. The NOTAM 406 may include one or more restricted flying areas (e.g., around the United States capital city) and the PIREP 408 may be associated include information regarding a flying area (e.g., an unusually high traffic area, etc.)

Figure 7:
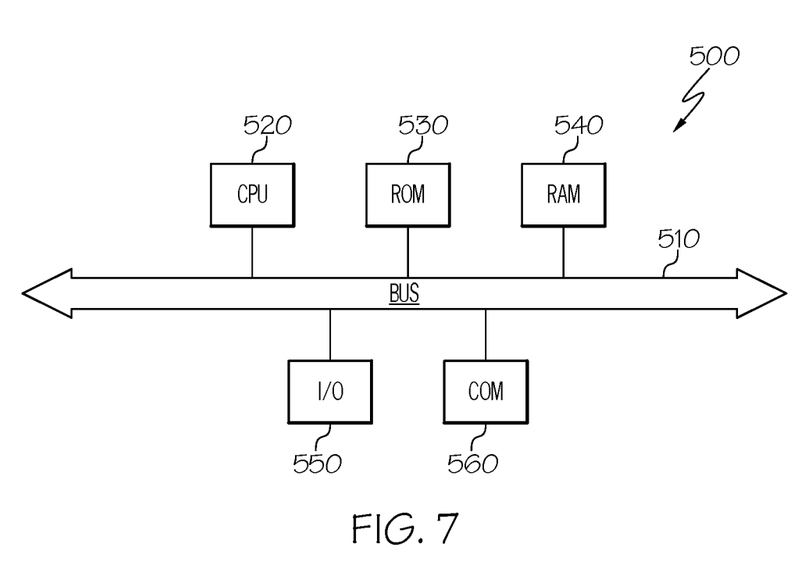
FIG. 7 depicts an exemplary computing environment for an aircraft such as the aircraft of FIG. 1.

FIG. 7 shows a simplified functional block diagram of a computing system 500 that may be configured for carrying out one or more of the steps, programs, and/or executing techniques described herein, according to exemplary embodiments of the present disclosure. Specifically, in one embodiment, any of the modules of the computing devices of any of the systems shown and described with respect to FIGS. 1, 2, and 3 may be an assembly of software and/or hardware including, for example, a data communication interface 560 for packet data communication. The platform may also include a central processing unit ("CPU") 520, in the form of one or more processors, for executing program instructions. The platform may include an internal communication bus 510, program storage, and data storage for various data files to be processed and/or communicated by the platform such as ROM 530 and RAM 540, although the system 500 may receive programming and data via network communications. The system 500 also may include input and output ports 550 to connect with input and output devices such as keyboards, mice, touchscreens, monitors, displays, etc. Of course, the various system functions may be implemented in a distributed fashion on a number of similar platforms, to distribute the processing load. Alternatively, the systems may be implemented by appropriate programming of one computer hardware platform.

FIG. 7 and the following discussion provide a brief, general description of a suitable computing environment in which certain embodiments and aspects thereof the present disclosure may be implemented. In one embodiment, any of the disclosed systems, methods, and/or graphical user interfaces may be executed by or implemented by a computing system consistent with or similar to that depicted in FIG. 7. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure also may be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

Figure 8:
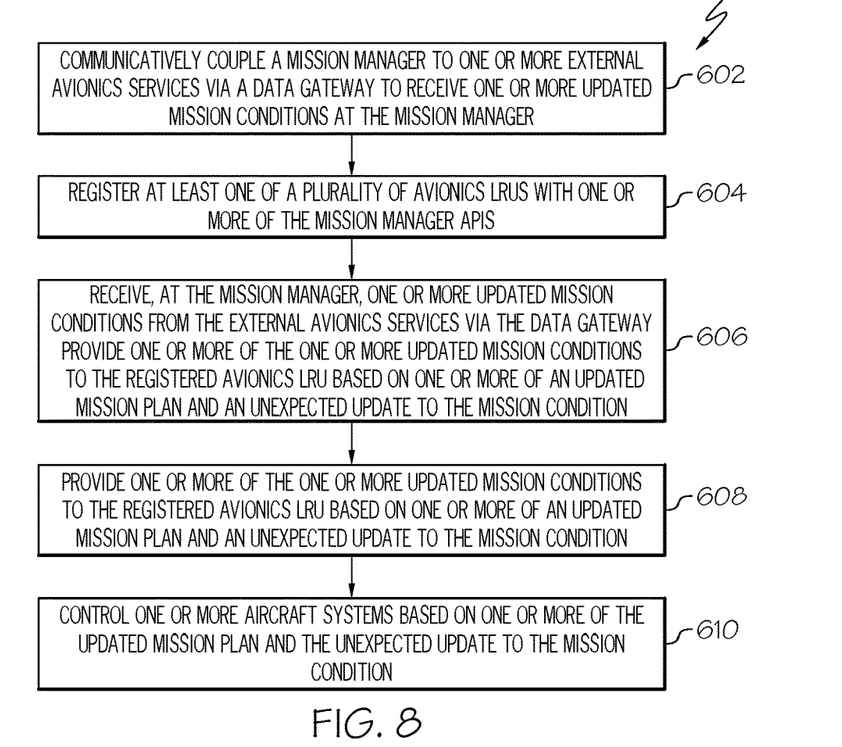
FIG. 8 depicts an exemplary method for self-contained mission management.

FIG. 8 shows a method 600 for updating one or more mission criteria using an on-board mission manager. It is to be understood that the method 600 is not limited to the steps and features explicitly listed therein and that modifications including additional or fewer steps and/or features are within the scope of the various embodiments described herein.

At step 602, a mission manager may be communicatively coupled to one or more external avionics services via a data gateway. Via the data gateway, the mission manager may receive, for example, one or more updated mission conditions. The avionics service may be, for example, an external weather service (e.g., a weather service that provides a forecasted wind). The mission manager may register with the external avionics service and subsequently receive the updated mission conditions. In some embodiments, the mission manager may routinely receive update mission conditions via the data gateway (e.g., every four hours the mission manager may receive updated weather conditions via the data gateway).

At step 604, the system may register at least one of the plurality of avionics LRUs with one or more of the mission manager APIs. The avionics LRUs may register, for example, as a client to the one or more mission manager APIs. For example, the FMS may register as a client to the mission manager wind APIs to receive a current wind (e.g., from the on-board radar system(s)) and may receive the forecasted weather from the external system (e.g., the external weather service).

At step 606, the mission manager may receive one or more updated mission conditions from the external avionics services via the data gateway. In some embodiments, the mission manager may be configured to automatically requested updates to mission conditions on a regular schedule (i.e., active mission condition requests). The schedule could be, for example, based on a time frame or based on a sensed condition from one or more aircraft sensors. For example, the system may request updated mission conditions every hour, every two hours, every four hours, etc. Additionally or alternatively, the system could request based on the updated sensed condition (e.g., a drop in air temperature as determined by on-board thermocouples, an increase in wind speed as determined by on-board pitot tubes or other sensors, etc.)

At step 608, the system may provide one or more of the one or more updated mission conditions to the registered avionics LRU based on one or more of an updated mission plan and an unexpected update to the mission condition. Accordingly, the updated and registered avionics LRU may continue to plan its portions of mission parameters based on the updated mission parameters. For example, a weather radar may update a recommended flight path (similar to the flight path 400 of FIG. 6) based on the weather forecast received from the external weather service. For example, if there is a high amount of wind along a given trajectory, the weather radar system may update a recommended flight path to avoid the high winds. Similarly, if a NOTAM has been issued for a given area (similar to the NOTAM 406 of FIG. 6 surrounding the Washington D.C.) the FMS may plan a route that avoids the NOTAM without any input from the crew of the aircraft.

At step 610, the system may control one or more aircraft systems based on one or more of the updated mission plan and the unexpected update to the mission condition. The one or more aircraft systems may be controlled by a control signal sent through, for example, the aircraft data gateway. For example, a radar system (e.g., the radar system 244) may receive a control signal. In some embodiments, the control signal may cause the radar system to change one or more of its operating parameters. For example, if a radar is operating using a current scan process (e.g., a vertical scan of within +/−1,000 vertical feet of the aircraft's current altitude) the current scan process may be updated to a second scan process (e.g., +/−1,500 vertical feet of the aircraft's current altitude) based on the update sent through the aircraft data gateway. In such a way, the aircraft can update one or more of its sensing and/or other systems in a self-contained manner based on updated circumstances.

Figure 9:
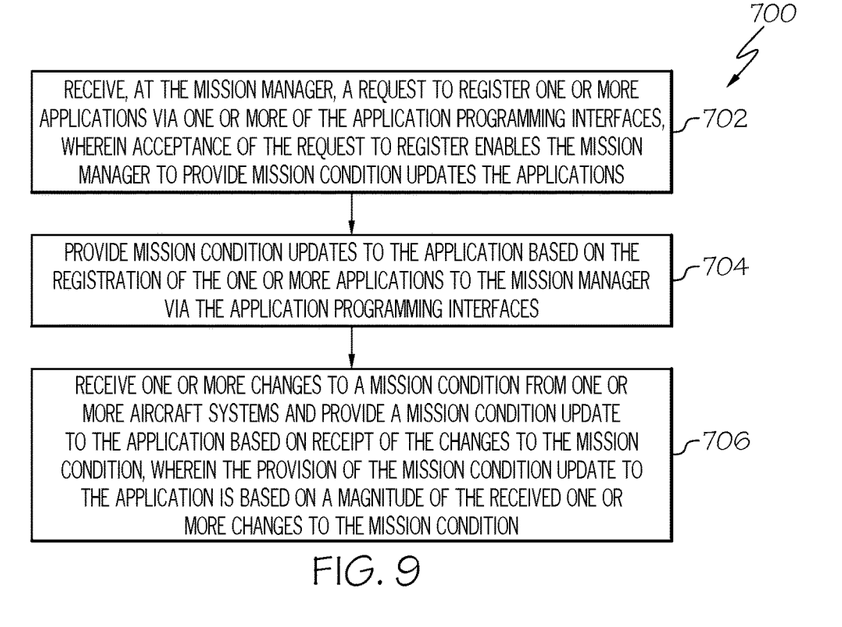
FIG. 9 depicts another exemplary method for self-contained mission management.

FIG. 9 shows a method 700 for updating one or more mission criteria using an on-board mission manager. It is to be understood that the method 700 is not limited to the steps and features explicitly listed therein and that modifications including additional or fewer steps and/or features are within the scope of the various embodiments described herein.

At step 702, the mission manager may receive a request to register one or more applications via one or more of the application programming interfaces. In some embodiments, acceptance of the request to register may enable the mission manager to provide mission condition updates the applications. For example, a ground scheduling application (e.g., the ATSU, a TCAR, etc.) may request to register with the mission manager. The ATSU may request to register with the mission manager based on one or more instructions stored in the ATSU that cause it to request an arrival ETA or based on instructions stored in another connected application. For example, with respect to the flight path 400 of FIG. 5, the ATSU may request an ETA for arrival in Washington D.C rom the FMS 30. The request may be sent via one or more of the communications channels described herein.

At step 704, based on the registration of the one or more applications to the mission manager via the application programming interfaces, the mission manager may provide mission condition updates to the application. For example, with respect to the exemplary flight path 400 shown in FIG. 6, the mission manager may provide routine updates to the ATSU based on the ETA into Washington D.C. The mission manager may send a status and or updates based on a routine time frame (which could be any time frame, e.g., every thirty seconds, thirty minutes, hour, etc.) or based on other factors, such as for example, based on requests from the various applications, avionics LRUs, etc.

At step 706, the mission manager may receive one or more changes to a mission condition from one or more aircraft systems and provide a mission condition update to the various other applications based on receipt of the changes to the mission condition. Provision of the mission condition update to the application may be based on a magnitude of the received one or more changes to the mission condition. For example, the mission manager may receive an updated arrival time from an FMS. The updated arrival may be based on one or more factors (e.g., a speed restriction for the aircraft (e.g., low fuel, loss of engine, flying through a NOTAM with a restricted air speed, etc.), unexpected weather delays as determined by a radar system, etc.) and the mission manager may update the other various connected systems in order to update the one or more mission parameters. For example, based on an unexpected air speed restriction that requires the aircraft to slow to an unexpectedly low speed, the FMS may update a flight plan (e.g., the flight plan 400) and the updated flight plan may be provided to an ATSU to plan for a delayed arrival and such that the ATSU can manage air traffic during the delayed arrival appropriately. In some embodiments, the ATSU may cause information to be sent to one or more external systems (e.g., via the aircraft gateway) such that the external systems are aware of the change in flight plan and can plan an updated traffic plan based on the change in flight plan.

It should now be understood that a common aircraft data gateway can be used for on-board mission management. The aircraft data gateway may communicatively couple to one or more aircraft systems including various avionics LRUs, which can detect flight conditions or receive information from one or more sensing systems configured to detect flight conditions, and provide flight information to the aircraft data gateway in order to distribute the information internally between the systems and/or externally with one or more external systems. Accordingly, a centralized data gateway can better coordinate the flow of information between on-board and external aircraft systems, thus enhancing a flight experience.

The general discussion of this disclosure provides a brief, general description of a suitable computing environment in which the present disclosure may be implemented. In one embodiment, any of the disclosed systems, methods, and/or graphical user interfaces may be executed by or implemented by a computing system consistent with or similar to that depicted and/or explained in this disclosure. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

The terminology used above may be interpreted in its broadest reasonable manner, even though it is being used in conjunction with a detailed description of certain specific examples of the present disclosure. Indeed, certain terms may even be emphasized above; however, any terminology intended to be interpreted in any restricted manner will be overtly and specifically defined as such in this Detailed Description section. Both the foregoing general description and the detailed description are exemplary and explanatory only and are not restrictive of the features, as claimed.

As used herein, the terms "comprises," "comprising," "having," including," or other variations thereof, are intended to cover a non-exclusive inclusion such that a process, method, article, or apparatus that comprises a list of elements does not include only those elements, but may include other elements not expressly listed or inherent to such a process, method, article, or apparatus.

In this disclosure, relative terms, such as, for example, "about," "substantially," "generally," and "approximately" are used to indicate a possible variation of ±10% in a stated value.

The term "exemplary" is used in the sense of "example" rather than "ideal." As used herein, the singular forms "a," "an," and "the" include plural reference unless the context dictates otherwise.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A system comprising:
a plurality of avionics line-replaceable units (LRUs);
a mission manager comprising one or more application programming interfaces (API);
a processing device, capable of executing one or more machine readable instructions; and
a memory storing one or more machine readable instructions, that when executed by the processing device cause the system to:
communicatively couple the mission manager to one or more external avionics services via a data gateway to receive one or more updated mission conditions at the mission manager;
register at least one of the plurality of avionics LRUs with one or more of the mission manager APIs;
receive, at the mission manager, one or more updated mission conditions from the external avionics services via the data gateway;
provide one or more of the one or more updated mission conditions to the registered avionics LRU based on one or more of an updated mission plan and an unexpected update to the mission condition; and
control one or more aircraft systems based on one or more of the updated mission plan and the unexpected update to the mission condition.

2. The system of claim 1, wherein the mission manager is configured to receive one or more updated mission conditions periodically.

3. The system of claim 2, wherein the periodicity is based on a regulatory requirement.

4. The system of claim 3, wherein the regulatory requirement is stored in an on-board electronic flight bag (EFB).

5. The system of claim 1, wherein the one or more avionics LRUs include one or more of a flight management system (FMS), an enhanced ground proximity warning system (EGPWS), an air traffic services unit (ATSU), and a radar.

6. The system of claim 1, wherein the updated mission plan includes a change to a flight route.

7. The system of claim 1, wherein the one or more updated mission conditions are provided to the registered avionics LRUs based on an update from one or more ground-based services.

8. The system of claim 1, wherein the one or more avionics LRUs automatically register with the mission manager.

9. The system of claim 1, wherein the mission manager comprises a data monitoring function such that it continuously monitors data from one or more ground-based services for a change in a mission condition.

10. The system of claim 1, wherein the mission manager comprises a response builder function such that it generates an appropriate response to a change in a mission condition and provides the appropriate response to the registered avionics LRU.

11. A method comprising:
communicatively coupling a mission manager including one or more mission manager APIs communicatively coupled to a plurality of avionics LRUs to one or more external avionics services via a data gateway to receive one or more updated mission conditions at the mission manager;
registering at least one of the plurality of avionics LRUs with one or more of the mission manager APIs;
receiving, at the mission manager, one or more updated mission conditions from the external avionics services via the data gateway; and
providing one or more of the one or more updated mission conditions to the registered avionics LRU based on one or more of an updated mission plan and an unexpected update to the mission condition.

12. The method of claim 11, wherein the mission manager is configured to receive one or more updated mission conditions periodically.

13. The method of claim 12, wherein the periodicity is based on a regulatory requirement.

14. The method of claim 13, wherein the regulatory requirement is stored in an on-board electronic flight bag (EFB).

15. The method of claim 11, wherein the one or more avionics LRUs include one or more of an FMS, an EGPWS, an ATSU, and a radar.

16. The method of claim 11, wherein the updated mission plan includes a change to a flight route.

17. A system comprising:
a plurality of avionics line-replaceable units (LRUs);
a mission manager comprising one or more application programming interfaces (API) communicatively coupled to one or more applications;
a processing device, capable of executing one or more machine readable instructions; and
a memory storing one or more machine readable instructions, that when executed by the processing device cause the system to:
receive, at the mission manager, a request to register one or more applications via one or more of the application programming interfaces, wherein acceptance of the request to register enables the mission manager to provide mission condition updates the applications;
provide mission condition updates to the application based on the registration of the one or more applications to the mission manager via the application programming interfaces; and
receive one or more changes to a mission condition from one or more aircraft systems and provide a mission condition update to the application based on receipt of the changes to the mission condition, wherein the provision of the mission condition update to the application is based on a magnitude of the received one or more changes to the mission condition.

18. The system of claim 17, wherein the mission condition updates are based on data from one or more avionics LRUs.

19. The system of claim 18, wherein the one or more avionics LRUs include one or more of an FMS, an EGPWS, an ATSU, and a radar.

20. The system of claim 17, wherein the mission manager is further configured to receive one or more updates from an EFB.

* * * * *